US006996230B1

(12) United States Patent
Chu et al.

(10) Patent No.: US 6,996,230 B1
(45) Date of Patent: Feb. 7, 2006

(54) ECHO-CANCELER FOR PRECODED FRACTIONALLY SPACED RECEIVER USING SIGNAL ESTIMATOR

(75) Inventors: Fred T. Chu, Madison, AL (US); Michael D. Turner, Huntsville, AL (US); Ayman K. Ghobrial, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 190 days.

(21) Appl. No.: 10/460,968

(22) Filed: Jun. 13, 2003

(51) Int. Cl.
*H04B 3/23* (2006.01)

(52) U.S. Cl. .................................. 379/406.08; 370/286

(58) Field of Classification Search ........... 379/406.01, 379/406.1; 370/286–292
See application file for complete search history.

(56) References Cited

U.S. PATENT DOCUMENTS

| | | | | |
|---|---|---|---|---|
| 3,878,468 | A | 4/1975 | Falconer et al. | 325/42 |
| 3,974,449 | A | 8/1976 | Falconer | 178/88 |
| 4,071,298 | A | 1/1978 | Falconer | 356/73 |
| 4,074,086 | A | 2/1978 | Falconer et al. | 179/170.2 |
| 4,181,888 | A | 1/1980 | Falconer | 325/42 |
| 4,213,095 | A | 7/1980 | Falconer | 375/14 |
| RE31,351 | E | 8/1983 | Falconer | 375/15 |
| 4,479,092 | A | 10/1984 | Falconer | 329/145 |
| 4,535,206 | A | 8/1985 | Falconer | 179/170.2 |
| 5,159,608 | A | 10/1992 | Falconer et al. | 375/1 |
| 5,204,874 | A | 4/1993 | Falconer et al. | 375/1 |
| 5,204,876 | A | 4/1993 | Bruckert et al. | 375/1 |
| 5,235,614 | A | 8/1993 | Bruckert et al. | 375/1 |
| 5,442,661 | A | 8/1995 | Falconer | 375/205 |
| 2003/0081763 | A1 * | 5/2003 | Tang et al. | 379/406.01 |

OTHER PUBLICATIONS

Adaptive Reference Echo Cancellation, David D. Falconer, IEEE Transactions On Communication, vol. COM-30, No. 9, Sep. 1982, no day.

Matched-Transmission Technique For Channels With Intersymbol Interference, Hiroshi Harashima & Hiroshi Miyakawa, IEEE Transactions On Communications, vol. COM-20, No. 4, Aug. 1972, no day.

New Automatic Equaliser Employing Module Arithmetic, M. Tomlinson, Electronics Letters, vol. 7, No. 5, Mar. 1971, no day.

* cited by examiner

*Primary Examiner*—Daniel Swerdlow
(74) *Attorney, Agent, or Firm*—Allen, Dyer, Doppelt Milbrath & Gilchrist, P.A.

(57) ABSTRACT

An echo canceler for a fractionally spaced telecommunication receiver employs a signal estimator, which generates a fractionally spaced representation of a received information signal that has been subjected to Tomlinson preceding. The output of the signal estimator is differentially combined with fractionally spaced outputs of the echo canceller, so as to effectively remove the contribution of the received information signal from the echo cancellation update operation. As a result, the echo update signal will consist primarily of the residual echo and the noise from the wireline/loop. The error signal can be used at the fractional spacing rate to update all of the echo canceler coefficients, largely without interference from the much larger received information signal. This allows a higher echo canceler gain than that currently incorporated into HDSL2 echo canceler updates.

10 Claims, 4 Drawing Sheets

ECHO-CANCELER FOR PRECODED FRACTIONALLY SPACED RECEIVER USING SIGNAL ESTIMATOR

FIELD OF THE INVENTION

The present invention relates in general to telecommunication systems and subsystems therefor, and is particularly directed to a new and improved echo canceler architecture for a precoded, fractionally spaced telecommunication transceiver, such as an HDSL2 communication transceiver, that employs a signal estimator which is effective to remove the contribution of the received far-end information signal from the echo cancellation update operation, so that the echo update signal will consist primarily of the residual echo and the noise from the wireline/loop. This error signal can now be used at the fractional spacing rate to update all the echo canceler coefficients, largely without interference from the larger received far-end signal. As a result, a higher echo canceler gain can be used than that currently incorporated into HDSL2 echo canceler updates.

BACKGROUND OF THE INVENTION

FIG. 1 diagrammatically illustrates a conventional telecommunication transceiver of the type that may be employed for processing HDSL2 signals, including performing echo cancellation, received from a telecommunication wireline pair. The transceiver incorporates Tomlinson preceding and a T/2-spaced receiver equalizer. Because such preceding is not compatible with the traditional decision feedback (DFB) methods used with original HDSL technology, the conventionally employed receiver DFB algorithm has been replaced with an alternative nonlinear technology—a Tomlinson precoder, in the transmitter. See, for example, the articles entitled: "Matched-Transmission Technique for Channels With Intersymbol Interference", by H. Harashima et al, IEEE Transactions on Communications, Vol. COM-20, No. 4, August, 1972, and "New Automatic Equaliser Employing Modulo Arithmetic," by M. Tomlinson, Electronics Letters, Vol. 7, No. 5, March 1971.

In the transceiver of FIG. 1, the incoming signal from an upstream analog front end (not shown) is digitized by an analog-to-digital converter 10 and sampled by way of a fractionally spaced (e.g., two samples per symbol) sampling operator, represented by a T/2 switch 20. The output of the T/2 sampling switch is coupled to a first (+) input 31 of a subtraction operator 30. A second (−) input 32 of the subtraction operator is coupled to the output of an echo canceler 40 by way of (T/2) fractionally spaced sampling operator 50. Echo canceler 40 is coupled to receive the transmitted (TX) signal that is originally applied to the wireline pair. (As pointed out above, the transmitted signal is shown as being subjected to a pre-encoding (e.g., Tomlinson encoding) operator 60.)

The output 33 of the subtraction operator 30 is sampled by way of a further fractionally spaced (T/2) operator 70, the output of which is coupled to a linear equalizer 80, and also fed back as an error signal E1 that is used to update the coefficients of the echo canceler 40. The output of the equalizer is coupled through a unit (one sample per symbol) operator 100 for application to a decision device (e.g., slicer) 110. Due to the presence of the Tomlinson precoder 60 in the signal path of the far-end transmitter (not shown), the output of the linear equalizer 80 is subjected to a modulo-decoder 120 prior to being coupled to the decision slicer 110. The taps of the equalizer 80 are updated by subtracting the output of the slicer 110 from its input in a subtraction operator 130 to produce an error signal E2. This error signal is coupled to the linear equalizer 80 by way of a T-spaced sampling operator 140.

In the transceiver of FIG. 1, the Tomlinson precoder provides an equivalent function of a decision feedback (DFB) equalizer. Due to the incompatibility of the DFB and the preceding used in HDSL2, it is necessary to use this nonlinear preceding at the far-end transmitter to replace the DFB at the local receiver. This results in the use of a nonlinear modulo device 120 after the linear equalization, in order to undo the nonlinear preceding at the far-end transmitter. A start-up coefficient exchange protocol is also needed to convey the DFB information from the local receiver to the far-end transmitter.

These developments have mandated changes in some other receiver algorithms. Among these are methods of providing echo canceler updates during initial training and during data mode when the nonlinear precoder is enabled.

In the receiver and echo cancellation architecture of FIG. 1, the error signal E1 for updating the coefficients of the echo canceler is taken immediately after the point of echo cancellation. This error signal offers a couple of advantages over other choices. First, it is available for each sample at which echo cancellation occurs—in this case, at a T/2 rate. Second, it is available immediately, so that there is no delay in processing the updates. Unfortunately, it has one major disadvantage: the error signal taken immediately after the point of echo cancellation contains the desired received far-end signal, in addition to the residual echo error and loop noise.

Under proper operating conditions, the echo signal must be suppressed far below the level of the received far-end signal, preferably substantially below the level of received background noise, in order to avoid losing margin performance due to residual echo. As a consequence, after echo canceler convergence when the system is operating properly, the error signal that functions to update the echo canceler should be buried to a depth well over 30 dB below the desired received far-end signal. This kind of cancellation is necessary in order to ensure that the echo canceler does not compromise margin performance; however, the received far-end signal appears as noise or interference to the echo canceler update algorithm.

Because the echo canceler update error signal appears noisy (being covered up by the received far-end signal) after the error converges to the low residual echo levels required, the update gain for the echo canceler must be set extremely low, in order to filter out the noise and provide accurate updates. Unfortunately, at very low gain levels the echo canceler taps are only able to adapt at a very slow rate. Thus, the echo canceler cannot respond rapidly to changes in the echo. If such changes occur, they lead to reduced echo cancellation and diminished performance (loss of margin or errors or even receiver failure) until the echo canceler can re-converge.

Some recent developments in wireline communication technology have highlighted problems associated with the slower echo canceler update. It appears that rapid changes in the loop may result in sudden changes in the echo that require more rapid echo canceler adaptation. The solution requires an error signal that can update two samples per symbol, but at the same time be sufficiently noise-free to allow much more rapid updates.

SUMMARY OF THE INVENTION

In accordance with the present invention, the above-discussed problems of conventional echo-cancelers are successfully addressed by subjecting the output of the decision slicer to a fractionally spaced interpolation filter, that is operative to provide signal estimates of the desired far-end signal supplied to the linear equalizer. The desired far-end signal estimate is then subtracted from a delayed version of the total signal taken at that point. What results is a set of error signal updates for the echo canceler in which the received far-end signal has been relatively completely canceled.

To this end, the output of the decision slicer is coupled to a zero-insertion operator, which is operative to insert '0's between adjacent T-spaced signal decisions, namely at times T/2 between the outputs of the decision slicer. This fractionally spaced (T/2) set of signals is then coupled to a signal estimator, which may be implemented as an adaptive finite impulse response filter (tapped delay line). The output of the signal estimator constitutes a T/2 space set of estimates of the received far-end signal input to linear equalizer. The outputs of the signal estimator and a delayed version of the input to the linear equalizer are differentially combined in a subtraction operator, to produce error estimation signal sets for updating the coefficients of the echo canceler.

The use of a delay line is necessary because, in order to estimate the received far-end signal at the linear equalizer input, the signal estimator must have access to the decisions associated with the signal at that point. Due to the delay through the linear equalizer, the necessary decisions are not immediately available. The delay is made sufficiently long for the linear equalizer input signal to propagate at least as far as the main (cursor) tap of the linear equalizer, plus somewhat farther, so that signal precursors are also canceled. By sufficiently delaying the input to the linear equalizer, the signal estimator has in its delay line all symbol decisions that significantly contribute to the signal at the linear equalizer input.

Because the echo canceler error updates are residual signals that remain after subtracting the ideal decision values for the received signal, the received far-end signal will have been largely removed. As a result, the error updates provide a much quieter measure of the residual echo, and allow for higher update gains and correspondingly faster response to changes in the echo. Since the error signals produced by the subtraction operator are available at the same fractional spacing of the processed received signals, they can be directly used to update the fractionally spaced coefficients of the echo canceler (two are required per symbol) in an HDSL2 transceiver.

When a Tomlinson precoding-based HDSL2 transceiver architecture of the type shown in FIG. 1 is modified to incorporate the present invention, an expanded or "extended" constellation in the received signal is produced, with the basic constellation size periodically extended above and below the normal constellation range. To recover the original constellation points, a modulo-decoder is installed between linear equalizer output and the decision slice. At the input to the linear equalizer, the signal path is well upstream of the module operation, so that the received signal constellation at that point is an extended constellation. Therefore, to estimate the signal at that point, it is first necessary to construct decision points that represent the ideal received signal points, as they existed prior to the module operation.

To this end, an un-modulo operator is coupled to the output of the decision slicer. The un-modulo operator is driven by a similar mathematical function as the module operator, and is operative to reverse the operation of the module operator. Because the module operation consists simply of adding or subtracting known constants to the signal upstream of the slicer, this operation is readily reversed with the additive inverse values applied to the decision points by way of the un-modulo operator. The un-modulo operation produces a sequence of ideal decision points that correspond to the received extended constellation. The ideal extended constellation decisions are interleaved with zeroes (to increase the sampling rate to T/2) and then applied to the signal estimator.

The output of the signal estimator is subtracted from the delayed input to the linear equalizer, to produce a series of T/2-spaced error signals that represent the difference between the delayed input to the linear equalizer and the signal estimator output. Once the adaptive signal estimator has converged to its best estimate of the received far-end signal at the equalizer input, the echo update error signal will consist primarily of the residual echo and the noise from the wireline loop. This error signal can now be used at the T/2 rate to update all the echo canceler coefficients, largely without interference from the much larger received far-end signal. This allows the use of a higher echo canceler gain than that currently incorporated into HDSL2 echo canceler updates.

DETAILED DESCRIPTION

Figure 1:
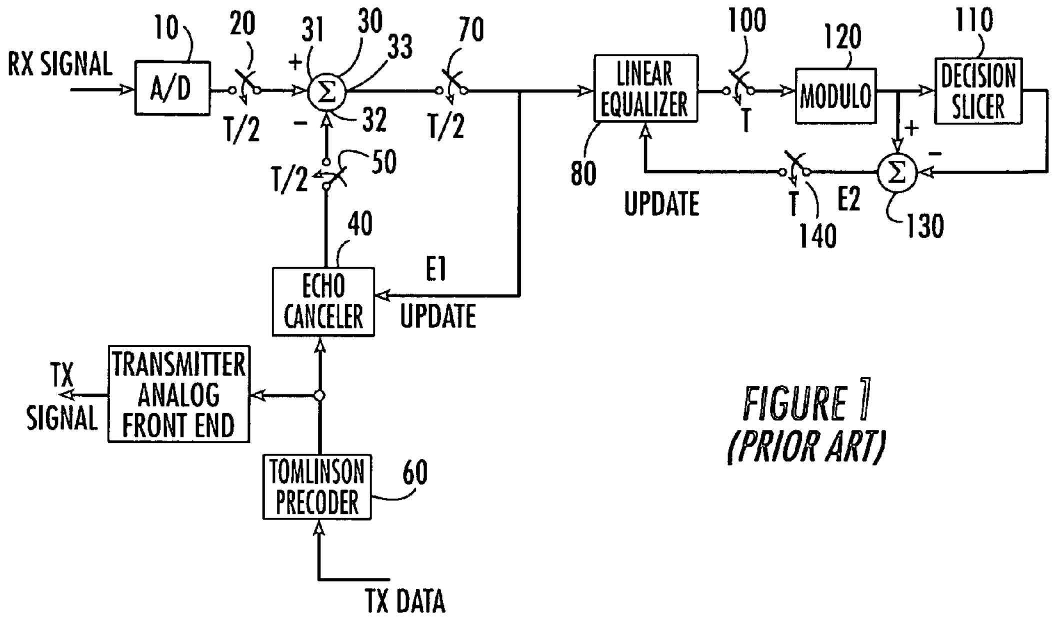
FIG. 1 diagrammatically illustrates a conventional telecommunication transceiver of the type that may be employed for processing HDSL2 signals, including performing echo cancellation, received from a telecommunication wireline pair.

Before describing in detail the signal estimator-based fractionally spaced echo canceler of the present invention, it should be observed that the invention resides primarily in prescribed modular arrangements of conventional digital communication circuits and associated digital signal processing components and attendant supervisory control circuitry therefor, that controls the operations of such circuits and components. In a practical implementation that facilitates their being packaged in a hardware-efficient equipment configuration, these modular arrangements may be readily implemented as field programmable gate array (FPGA), application specific integrated circuit (ASIC) chip sets, or in software running on digital signal processors (DSPs).

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

Figure 2:
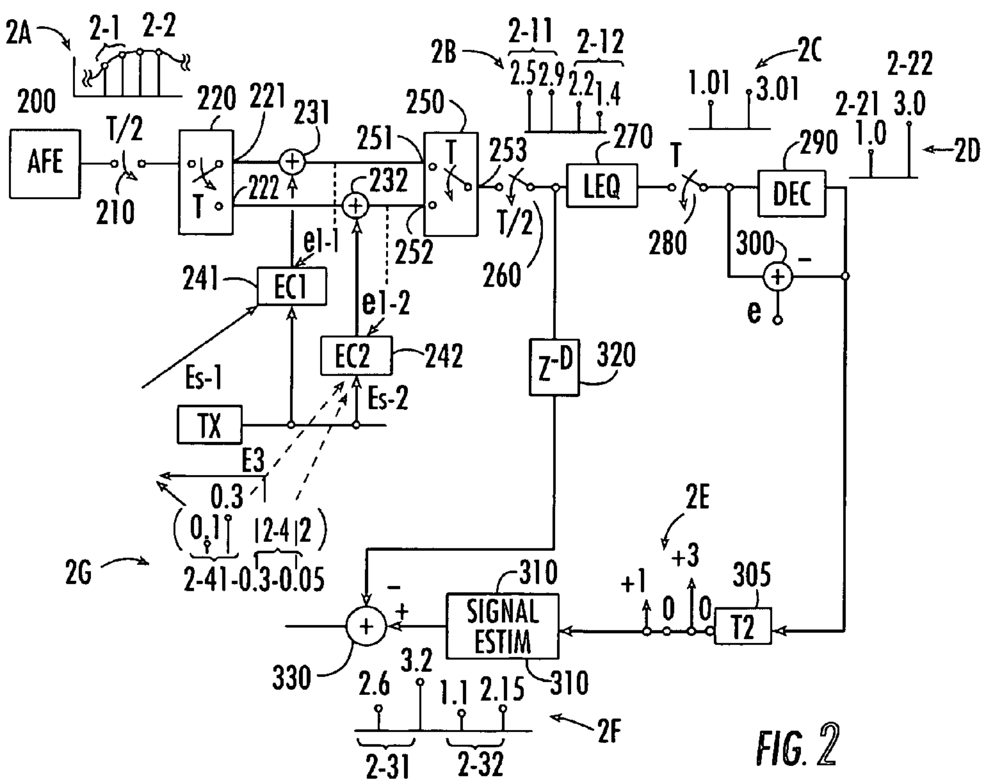
FIG. 2 diagrammatically illustrates a telecommunication receiver and echo canceler architecture employing a fractionally spaced interpolation filter.

In order to facilitate an appreciation of the signal estimator mechanism employed by the present invention, it is initially useful to reconfigure the receiver and echo cancellation architecture of FIG. 1 in the detailed arrangement shown in FIG. 2, wherein the preceding and modulo-decoding components have been removed, and the echo cancellation operator has been subdivided into a pair of fractional spacing echo cancellation paths, one for each T/2 sample. Also shown in FIG. 2 are associated signal sample diagrams 2A–2G, for the purpose of illustrating a non-limiting example of the effects of the operations of various components of the receiver as a received signal propagates therethrough.

More particularly, in the receiver architecture of FIG. 2, the output of an analog front end (AFE) 200 is sampled by a T/2 fractional spacing switch 210, the output of (shown by sequential pairs of signal samples 2-1, 2—2 in the signal diagram 2A) is coupled to a T-spaced multiplexer 220. Multiplexer 220 has respective output ports 221 and 222 coupled to subtraction operators 231 and 232, which are coupled to the outputs of T-spaced echo cancelers 241 and 242 (which represent the functionality of the echo canceler 40 of FIG. 1). Echo cancelers 241 and 242 are coupled to receive the originally transmitted (Tx) signal, as well as error signal components. In the architecture of FIG. 1, these error signal components correspond to the error signal E1 and are represented in FIG. 2 by dotted signal paths e1-1 and e1-2 from subtraction operators 231 and 232. In accordance with the present invention, the error signal E1 (and thus the error signal paths e1-1 and e1-2) is replaced by signal estimator-based error signal Es-1 and Es-2 derived by way of a signal estimator 310, as will be described.

The outputs of subtraction operators 231 and 232 are coupled to respective input ports 251 and 252 of a T-spaced demultiplexer 250, whose output port 253 is coupled through a fractionally spaced (T/2) switch 260 for application to linear equalizer 270. A signal sample diagram 2B associated with the output of the T/2 spaced switch 260 shows two successive pairs of fractionally spaced symbol samples 2-11 and 2-12, which are respectively associated with the original signal sample pairs 2-1 and 2—2. In the present example, the first or leading-in-time symbol sample pair 2-11 is shown as being comprised of the symbol sample values 2.5 and 2.9; the second or later-in-time symbol sample pair 2-12 is shown as comprised of the symbol sample values 2.2 and 1.4.

Linear equalizer 270 has its output coupled through a T-spaced switch 280, which couples to a decision slicer 290 a pair of equalized symbol values (associated with symbol sample pairs 2-11 and 2-12), shown in signal sample diagram 2C as having values 1.01 and 3.01. Decision slicer 290 converts these values to ideal symbol values, shown at 2-21 and 2-22 in signal diagram 2D as having the values 1.0 and 3.0, respectively. The input and output of the decision slicer 290 are applied to a subtraction operator 300, to produce a pair of error components. As described above, these error components (corresponding to the error signal E2 in FIG. 1) are used to update the taps of the linear equalizer.

Because these errors are the residual after subtracting the ideal decision values for the received signal, the received far-end signal has been largely removed from this error. Only residual components of the received far-end signal that were not properly equalized remain (in addition to noise and the residual echo that is needed to drive the echo canceler update). Therefore, this error signal provides a much quieter measure of the residual echo, and allows for much larger update gains and correspondingly faster response to changes in the echo. Unfortunately, this error signal is only available once per symbol at the instants T when decisions are made and, consequently, cannot be directly used to update the fractionally spaced (T/2) coefficients of the echo canceler (two of these are required per symbol) in an HDSL2 transceiver.

This problem is successfully addressed by processing the output of the decision slicer 290 with a fractionally spaced interpolation filter to provide signal estimates of the received far-end signal at the input to the linear equalizer and then subtracting it from the total signal taken at that point, in order to generate for the echo canceler an error signal update from which the received far-end signal has been relatively completely canceled.

To this end, the output of the decision slicer 290 is coupled to a zero-insertion operator 305 which, as shown in signal diagram 2E, is operative to insert ‘0’s between adjacent T-spaced signal decisions, namely at times T/2 between the outputs of the decision slicer 290. This fractionally spaced (T/2) set of signals is then coupled to a signal estimator 310, which may be implemented as an adaptive finite impulse response filter (tapped delay line) as shown. The output of the signal estimator 310 (shown as signal pair 2-31 having values 2.6, 3.2 and signal pair 2-32 having values 1.1 and 2.15 in signal diagram 2F) constitutes a T/2 space set of estimates of the received far-end signal coupled to linear equalizer 270.

In order allow for extraction of error components in this set of signals, the input to the equalizer 270 is coupled through a delay line 320, which compensates for the propagation delay through the equalizer and downstream components including the signal estimator 310 (and thereby provides time alignment between the respective received signal waveforms 2-11 and 2-12 of signal diagram 2B with received far-end signal estimates 2-31 and 2-32 of signal diagram 2F). The outputs of the signal estimator 310 and delay line 320 are differentially combined in subtraction operator 330, to produce error estimation signal sets (shown in signal diagram 2G has error signal set 2-41 having values 0.1, 0.3 and error signal set 2-42 having values −0.3 and −0.05), as an echo canceler update signal E3.

As pointed out above, because these error signal sets are the residual after subtracting the ideal decision values for the received signal, the received far-end signal has been largely removed. As a result, they provide a much quieter measure of the residual echo, and allow for much larger update gains and correspondingly faster response to changes in the echo. As the error signals produced by the subtraction operator 330 are available at the same fractional spacing of the processed received signals, they can be directly used to update the fractionally spaced coefficients of the echo canceler (two of these are required per symbol) in an HDSL2 transceiver.

To this end, alternate first ones of the respective error values are supplied as updates to the echo canceler 241, while alternate second ones of the respective error values and supplied as updates to the echo canceler 242. Namely, there are error signal estimates at alternate time points (corresponding to T points and T/2 points). In the error signal diagram 2G, therefore, the error signal value 0.1 of the error signal set 2-41 and the error signal value –0.3 of the error signal set 2-42 are coupled as updates to the echo canceler 241, while the error signal value 0.3 of the error signal set 2-41 and the error signal value –0.05 of the error signal set 2-42 are coupled as updates to the echo canceler 242.

Figure 3:
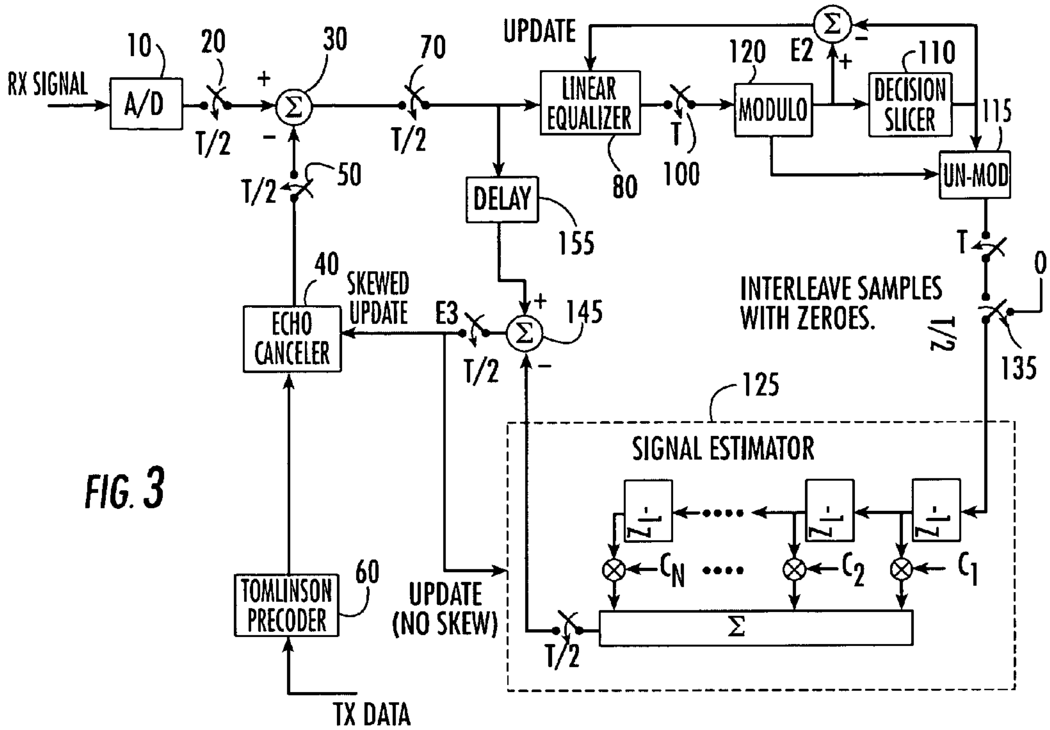
FIG. 3 diagrammatically illustrates a modification of the telecommunication receiver and echo canceler architecture of FIG. 1 to incorporate a fractionally spaced interpolation filter in accordance with the invention.

As noted above, in the receiver architecture of FIG. 2, the Tomlinson preceding and decoding components of FIG. 1 have been removed to facilitate the description of the signal estimator-based echo canceler update mechanism of the invention. When the architecture of FIG. 1 is modified to incorporate the present invention, the receiver structure of FIG. 3 is realized. As noted above in connection with the description of FIG. 2, slicer decisions represent ideal signal symbol values (constellation points) for the received far-end signal. Because a Tomlinson structure generates an expanded or "extended" constellation in the received signal, the basic constellation size is periodically extended above and below the normal constellation range.

Therefore, as in the arrangement of FIG. 1, to recover the original constellation points, in the receiver of FIG. 3, a modulo-decoder 120 is installed between linear equalizer 80 output and the slicer 110. At the input to the linear equalizer 80, the signal path is well upstream of the modulo operation, so that the received signal constellation at that point is an extended constellation. As a result, to estimate the received far-end signal at that point, it is first necessary to construct decision points that represent the ideal received signal points, as they existed prior to the modulo operation.

To this end, the architecture of FIG. 3 includes an un-modulo operator 115 coupled to the output of the decision slicer 110. The un-modulo operator 115 is driven by a similar mathematical function as the modulo operator 120, and is operative to reverse the operation of the modulo operator. Note that the modulo operation can be modeled as the simple addition of a sequence of values, determined point-by-point as the received signal is processed, and designed to map the received signal back into a specific constellation range. (This operation is similar to adding or subtracting multiples of $2\pi$ when working with trigonometric functions, to ensure that the values always belong to what is mathematically referred to as the "principal branch" of these functions—typically mapping values into the range from O to $2\pi$ or from $-\pi$ to $+\pi$.)

Figure 4A:
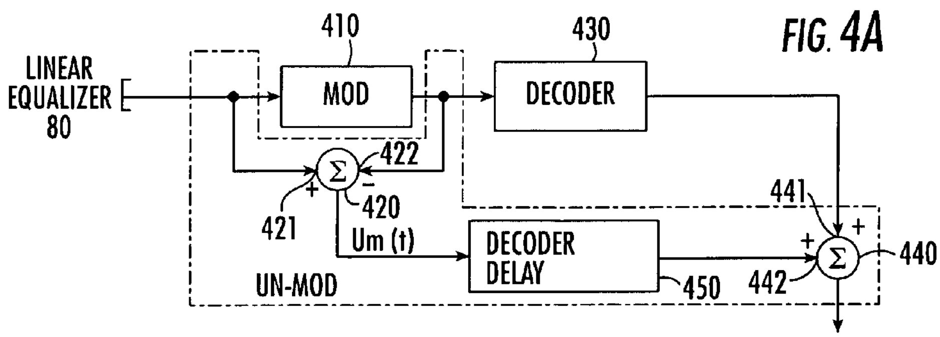
FIG. 4A diagrammatically illustrates a modified implementation of the un-modulo operator as required for systems incorporating error correcting coding.
Figure 4:
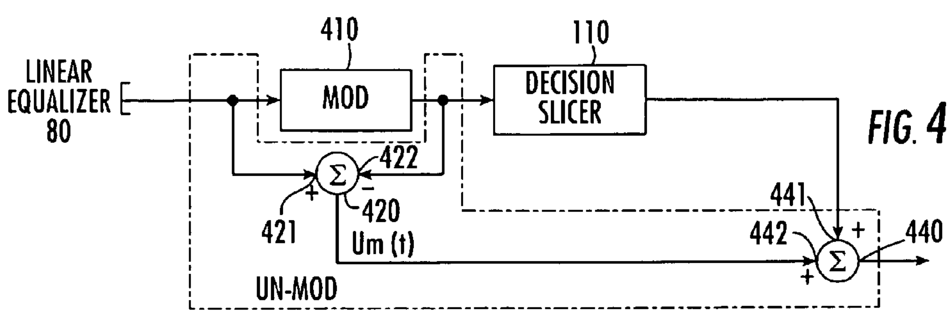
FIG. 4 diagrammatically illustrates an implementation of the un-modulo operator to derive the signal estimator input as depicted in FIG. 3.

Because the modulo operation consists simply of adding or subtracting known constants to the signal upstream of the slicer, it is a straightforward matter to reverse this operation and apply the additive inverse values to the decision points by way of the un-modulo operator 115. The un-modulo operation produces a sequence of ideal decision points that correspond to the received extended constellation. FIG. 4 diagrammatically illustrates an implementation of the un-modulo operator to derive the signal estimator input in FIG. 3. As shown therein, the output of the linear equalizer 80 is coupled to a module operator 410 and to a first (+) input 421 of a differential combiner 420, a second (–) input 422 of which is derived from the output of the module operator 410. The output of the modulo operator 410 is further coupled to a decision slicer 110, the output of which is coupled to a first input 441 of an adder 440. The output Um(t) of differential combiner 420 is coupled to a second input 442 of adder 440. The output of adder 440 is the unmodulo signal.

As in architecture of FIG. 2, the ideal extended constellation decisions are applied to a signal estimator 125, shown in FIG. 3 as a (delay line implemented) linear filter structure. As in the architecture of FIG. 2, prior to being coupled to the signal estimator the input decision points are interleaved with zeroes at 135, to increase the sampling rate to T/2. (Another way to implement this process is to have the decisions drive two distinct sets of taps, which generate the received far-end signal estimate at alternate time points (corresponding to T points and T/2 points, as described above with reference to FIG. 2).

The output of the signal estimator 125 is subtracted in subtraction operator 145 from the input to the linear equalizer 80, as delayed by delay unit 155. The T/2-spaced output of the subtraction operator 145 produces the error signal, E3, which represents the difference between the delayed input to the linear equalizer and the signal estimator output, as described above. Once the adaptive signal estimator 125 has converged to its best estimate of the received far-end signal at the equalizer input, the error signal E3 will consist primarily of the residual echo and the noise from the loop. This error signal can now be used at the T/2 rate to update all the echo canceler coefficients, largely without interference from the much larger received far-end signal. Therefore, a much higher echo canceler gain can be used than that currently incorporated into HDSL2 echo canceler updates. The E3 error is also used to update the signal estimator coefficients.

It may noted that because an HDSL2 system employs error correction and Tomlinson preceding, it is capable of operating at signal-to-noise ratio levels where the (uncoded) decision slicer can make errors at a much higher rate than in the data path with a decoder. These decision errors will be fed back into the signal estimator, where they will corrupt the signal estimator output and the E3 error until they make their way through the signal estimator delay line. It should be noted that these errors do not directly corrupt the echo estimate; they merely cause some degradation in the quality of the error signal used to update the echo canceler taps. Therefore, the error signal updating the signal estimator itself and the echo canceler may be subject to considerably more noise due to decision error, when operating at very low signal-to-noise ratio margin values.

As pointed out above, the input to the linear equalizer is delayed prior to being applied to the subtraction operator at the output of the signal estimator where the received far-end signal is canceled. This delay is necessary since, in order to estimate the received far-end signal at the linear equalizer input, the signal estimator must have access to the decisions associated with the signal at that point. Due to the delay in the linear equalizer, the necessary decisions are not immediately available. The delay block should be long enough to allow the linear equalizer input signal to propagate at least as far as the main (cursor) tap of the linear equalizer, plus somewhat more, so that signal precursors can be canceled as well. By delaying the signal sufficiently, the signal estimator has in its delay line all the symbol decisions that significantly contribute to the signal at the linear equalizer input. It is best not to make this delay any larger than necessary because it is in the echo canceler update path. Therefore, a long delay here will tend to limit the maximum speed feasible in the echo canceler update.

Also, this delay requires the use of what has been termed in the past a "skewed" update in the echo canceler. This means that the echo canceler delay line (not the number of coefficients) must be lengthened by the size of the delay. Furthermore, the update calculations use delay line values offset (skewed over) by an amount equal to the delay. This is necessary to achieve a proper least mean squared (LMS) update. The delay means that each value in the echo canceler delay line has been shifted away from the coefficient it multiplied in generating the echo estimate by the time the error associated with this estimate can be calculated.

In systems with error correcting coding, a modified implementation may be used such that the signal estimator 125 input is derived using the result of the error correcting decoder. In some implementations this error correcting decoder may additionally incorporate embedded modulo operations and unmodulo operations. The use of the error correcting decoder, rather than a simple decision slicer, requires additional delay in the updating of the signal estimator, but provides more reliable input decisions to the signal estimator. In this case, shown in FIG. 4A, the decision slicer is replaced by an error correcting decoder 430. To account for the delay required by the error correcting decoder, an additional decoder delay 450 must be incorporated in the path of the signal Um(t).

Figure 5:
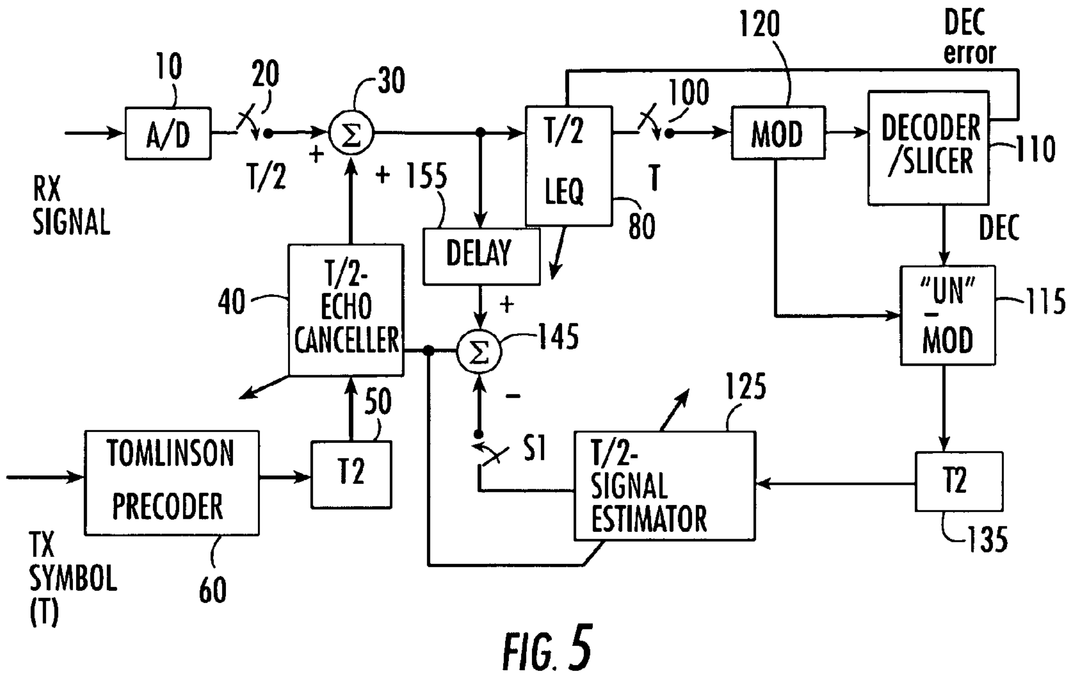
FIG. 5 diagrammatically illustrates a modification of the telecommunication receiver and echo canceler of FIG. 3 to highlight the initial training and a robust echo canceler update method in accordance with the present invention.
Figure 6:
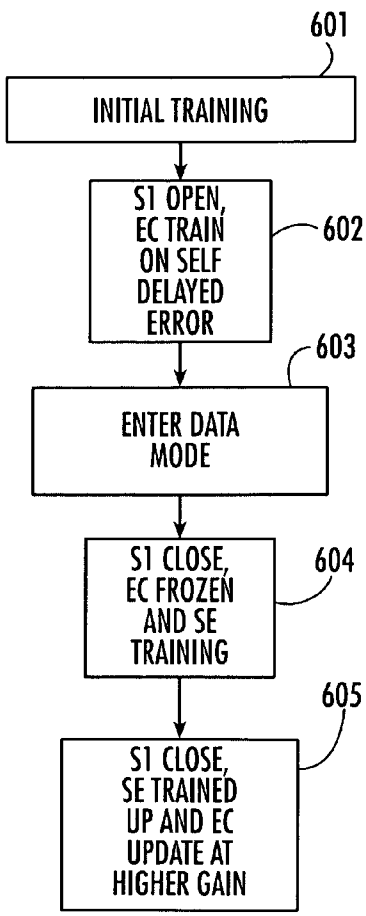
FIG. 6 is a flow chart of the initial training of an echo canceler and a signal estimator.

Since the performance of the signal estimator depends upon good decisions to estimate the far-end signal correctly, the echo canceler must be trained prior to the training of the signal estimator. A non-limiting example of such an initial training processes is diagrammatically shown in the receiver architecture of FIG. 5, which corresponds to the architecture of FIG. 3 with a switch S1 that is open during the initial training of the each canceller. In many practical data pump start-up procedures, the far-end transmitter is silent for a brief period of time. This allows the echo canceler self-error to be free of far-end signals during a portion of the start-up interval. Since it is necessary to update the echo canceler continuously during data mode, the signal estimator is trained during the early phase of the data mode to remove the received far-end signal component. Once the signal estimator is well converged, switch S1 is closed and the echo canceler update signal is switched to the signal estimator error, which allows the update gain to be higher. A flow chart of this initial training process is shown in FIG. 6.

As shown therein when entering initial training mode at step 601, the switch S1 is open, and the echo canceler (EC) trains on self delayed error in step 602. Then, upon transitioning to data mode in step 603, switch S1 is closed, echo canceler coefficients are frozen, and signal estimator (SE) training begins in step 604. Finally, in step 605, with switch S1 remaining closed, the signal estimator is trained up and the echo canceler is updated at a higher gain.

Figure 7:
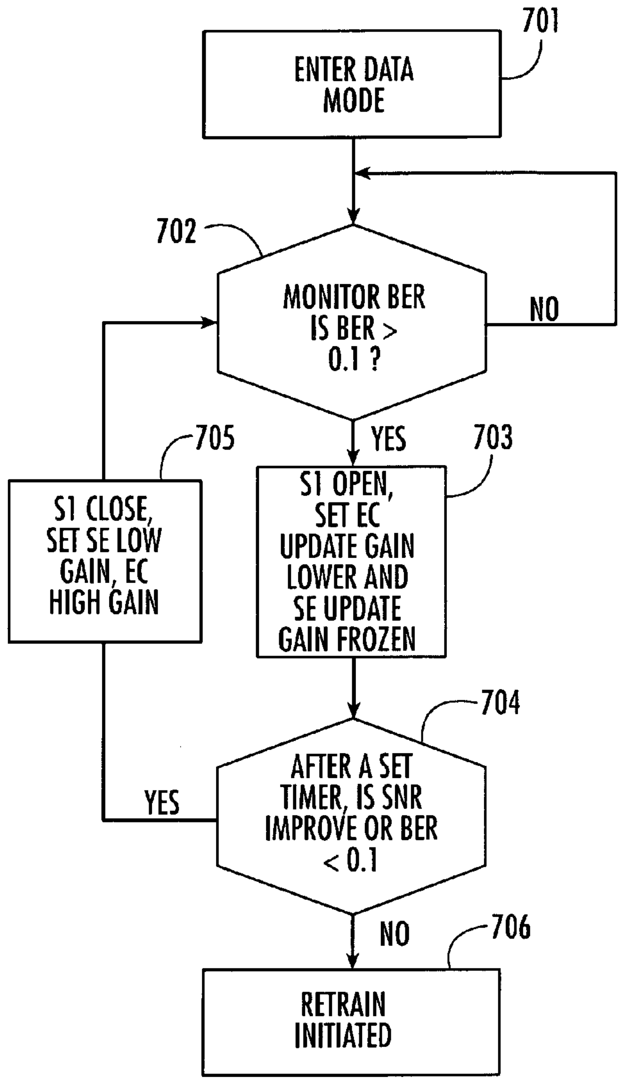
FIG. 7 is a flow chart of echo canceler update switching during the time when the decision error is relatively high.

One of the problems of using the signal estimator in HDSL2 or other precoder-based transceivers is the fact that the signal estimator is sensitive to decision errors. Such a decision directed structure can lead to erroneous signal estimates when the decision is not a high fidelity. This results in mis-adjustment of the echo canceler. FIG. 7 is a flow chart of a method for avoiding this scenario. As shown therein, upon entering data mode in step 701, the bit error rate (BER) is monitored in query step 702 by signal quality or decoder path metrics to determine if it is greater than a prescribed threshold (0.1). This allows a decision to be made whether the signal estimator update is suitable for that environment. As long as the BER is less than the threshold (the answer to query step 702 is NO), the process continues to self loop. If the bit error rate exceeds the threshold (the answer to query step 702 is YES), the routine transitions to step 703. In step 703, switch S1 of the architecture of FIG. 5 is open, the echo canceler updated gain is set lower and the signal estimator updated gain is frozen. Next, in query step 704 a determination is made, after a prescribed time out, whether the signal-to-noise ratio (SNR) has improved (whether the BER is less than the prescribed threshold (0.1)). If the answer to query step 804 is YES, the routine transitions to step 705, wherein switch S1 is closed, the signal estimator low gain is set, and the echo canceler high gain is set. The routine then loops back to query step 702. On the other hand, if query step 704 indicates insufficient signal quality improvement, (the answer to query step 704 is NO), the routine transitions to step 706, to initiate retraining of the receiver.

Figure 8:
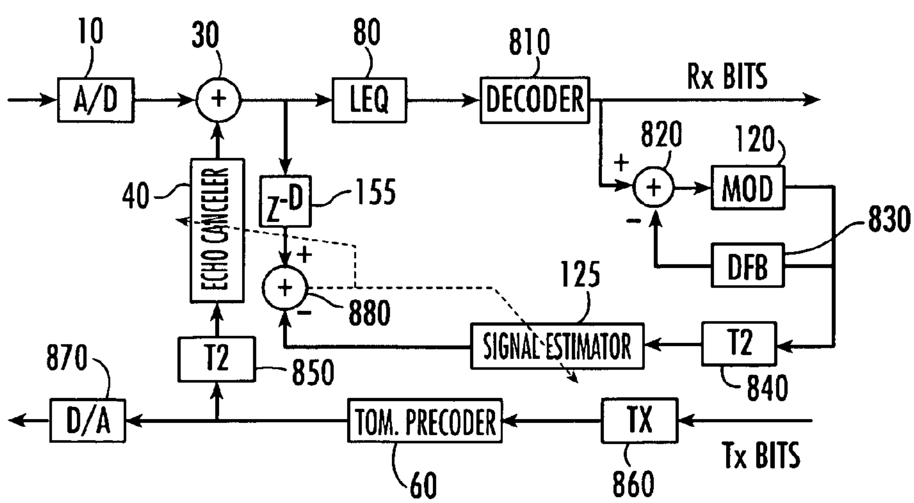
FIG. 8 diagrammatically illustrates a modification of the telecommunication receiver and echo canceler architecture of FIG. 1 to incorporate an alternative implementation of a fractionally spaced interpolation filter in accordance with the invention.

FIG. 8 diagrammatically illustrates an alternative architecture for deriving signal estimator samples. Since the objective is to remove the far-end signal with a high degree of accuracy, it is necessary to use a large number of signal estimator taps. This situation can be obviated by with the implementation of FIG. 8 to implement the effect of a Tomlinson precoder at the output of the decoder. This serves to reduce the number of signal estimator taps at the cost of an additional Tomlinson precoder at the receiver. Since the DFB operator is inactive during data mode, it can be reused, as a fixed precoder filter with the same coefficients as the local DFB, so that overall complexity of the receiver is reduced.

For this purpose, the output of the linear equalizer 80 is coupled to a decoder 810, from which derived estimates of the received far-end signal bits are derived. The output of the decoder 810 is coupled to a differential combiner 820, which also is coupled to the output of decision feedback operator 830 to which the output of the modulo operator 120 (which receives the output of the combiner 820) is coupled. The output of the modulo operator 120 is coupled through T2 switch 840 to signal estimator 125, the output of which is coupled to differential combiner 880. Signal combiner 880 further receives the output of delay line 155 and is used to control the coefficient taps of each of signal estimator 125 and echo canceler 40. The Tomlinson precoder 60 receives the output of transmitter 860 and couples its output to digital-to-analog (D/A) converter 870 for application to the line. The output of Tomlinson precoder 60 is further coupled through T2 switch 850 for application to the echo canceler 40.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of processing fractionally spaced samples of a signal received from a communication channel that is subject to interference by an echo of a transmitted signal that has been subjected to preceding comprising the steps of:

(a) coupling said fractionally spaced samples of said received signal to an echo cancellation operator to which said transmitted signal is coupled, and which is operative to remove said echo interference from said fractionally spaced samples of said received signal to provide echo-canceled representations of said received signal;

(b) processing said echo-canceled representations of said received signal in accordance with a decoder and producing fractionally spaced echo canceler update values from which a contribution of the received information signal has been effectively removed; and (c) adjusting operating parameters of said echo cancellation operator in accordance with said fractionally spaced echo canceler update values; and wherein step (b) comprises (b1) coupling said echo-canceled representations of said received signal to an equalizer to derive equalized values of said echo-canceled representations of said received signal;

(b2) processing said equalized values of said echo-canceled representations of said received signal in accordance with a decision operator to produce output signals representative of actual signal values that may have been originally transmitted;

(b3) subjecting said output signals to an interpolation filter that is operative to produce therefrom fractionally spaced estimates of said received signal; and (b4) differentially combining said echo-canceled representations of said received signal with said fractionally spaced estimates of said received signal to produce said fractionally spaced echo canceler update values; and wherein step (b2) includes processing said equalized values of said echo-canceled representations of said received signal in accordance with said decider, and processing output signals produced by said decision operator with a decoder compensation operator to produce said output signals representative of actual signal values that may have been originally transmitted; and wherein said preceding comprises Tomlinson precoding, and said decoder compensation operator comprises an un-modulo signal processing operator.

2. The method according to claim 1, wherein said fractionally spaced samples of said received signal correspond to two samples per symbol.

3. The method according to claim 1, wherein step (b3) comprises up-sampling said output signals of said decision operator representative of actual signal values that may have been originally transmitted to produce fractionally spaced signal values, and filtering said fractionally spaced signal values by means of a linear filter to produce therefrom said fractionally spaced estimates of said received signal.

4. The method according to claim 1, wherein said un-modulo signal processing operator comprises a modulo operator to which said output signals produced by said decision operator are applied, a first differential combiner which is operative to differentially combine said output signals produced by said decision operator and signals produced by said modulo operator, said first differential combiner having an output thereof coupled to a decoder, an output of which is coupled to a second differential combiner, said first differential combiner supplying an output thereof by way of a decoder delay to said second differential combiner, which produces the output of said un-modulo signal processing operator.

5. A method according to claim 1, wherein said un-modulo signal processing operator comprises a modulo operator to which said output signals produced by said decision operator are applied, a first differential combiner, which is operative to differentially combine said output signals produced by said decision operator and signals produced by said modulo operator, said first differential combiner having an output thereof coupled to a decision slicer, an output of which is coupled to a second differential combiner, said first differential combiner supplying an output thereof to said second differential combiner, which produces the output of said un-modulo signal processing operator.

6. An apparatus for processing fractionally spaced samples of a signal received from a communication channel that is subject to interference by an echo of a transmitted signal that has been subjected to precoding comprising:

an echo cancellation operator, to which said fractionally spaced samples of said received signal and said transmitted signal are coupled, and which is operative to remove said echo interference from said fractionally spaced samples of said received signal to provide echo-canceled representations of said received signal; and an echo cancellation operator adjustment mechanism which is operative to process said echo-canceled representations of said received signal using a decoder and producing fractionally spaced echo canceler update values from which a contribution of the received information signal has been effectively removed, and to adjust operating parameters of said echo cancellation operator in accordance with said fractionally spaced echo canceler update values; and wherein said echo cancellation operator adjustment mechanism comprises:

an equalizer which is operative to process said echo-canceled representations of said received signal to derive equalized values of said echo-canceled representations of said received signal;

a decision operator which is operative process said equalized values of said echo-canceled representations of said received signal to produce output signals representative of actual signal values that may have been originally transmitted;

an interpolation filter that is operative to filter said output signals so as to produce therefrom fractionally spaced estimates of said received signal; and a subtraction operator that is operative to differentially combine said echo-canceled representations of said received signal with said fractionally spaced estimates of said received signal produce fractionally spaced echo canceler update values, that are coupled to said echo cancellation to adjust operating parameters thereof; and wherein said transmitted signal is subjected to precoding, and further including a decoder that is operative to process said equalized values of said echo-canceled representations of said received signal, and a decoder compensation operator that is operative to process output signals produced by said decision operator to produce said output signals representative of actual signal values that may have been originally transmitted; and wherein said precoding comprises Tomlinson encoding, said decoder comprises a modulo-based decoder, and said decoder compensation operator comprises an un-modulo signal processing operator.

7. The apparatus according to claim 6, wherein said fractionally spaced samples of said received signal correspond to two samples per symbol.

8. The apparatus according to claim 9, wherein said interpolation filter includes an interpolator that is operative to up-sample said output signals of said decision operator representative of actual signal values that may have been originally transmitted to produce fractionally spaced signal values, and a linear filter that filters said fractionally spaced signal values to produce therefrom said fractionally spaced estimates of said received signal.

9. The apparatus according to claim 6, wherein said un-modulo signal processing operator comprises a modulo operator to which said output signals produced by said decision operator are applied, a first differential combiner which is operative to differentially combine said output signals produced by said decision operator and signals produced by said modulo operator, said first differential combiner having an output thereof coupled to a decoder, an output of which is coupled to said second differential combiner, said first differential combiner supplying an output thereof by way of a decoder delay to a second differential combiner, which produces the output of said un-modulo signal processing operator.

10. The apparatus according to claim 6, wherein said un-modulo signal processing operator comprises a modulo operator to which said output signals produced by said decision operator are applied, a first differential combiner, which is operative to differentially combine said output signals produced by said decision operator and signals produced by said modulo operator, said first differential combiner having an output thereof coupled to a decision slicer, an output of which is coupled to a second differential combiner, said first differential combiner supplying an output thereof to said second differential combiner, which produces the output of said un-modulo signal processing operator.

* * * * *

UNITED STATES PATENT AND TRADEMARK OFFICE

CERTIFICATE OF CORRECTION

PATENT NO. : 6,996,230 B1

APPLICATION NO. : 10/460968

DATED : February 7, 2006

INVENTOR(S) : Fred T. Chu, Michael D. Turner and Ayman K. Ghobrial

It is certified that error appears in the above-identified patent and that said Letters Patent is hereby corrected as shown below:

| | |
|---|---|
| Title Page, ABSTRACT | Delete: ABSTRACT<br>Insert: New ABSTRACT<br><br>-- An echo canceler for a fractionally spaced telecommunication receiver employs a signal estimator, which generates a fractionally spaced representation of a received information signal that has been subjected to Tomlinson precoding. The output of the signal estimator is differentially combined with fractionally spaced outputs of the echo canceller, so as to effectively remove the contribution of the received information signal from the echo cancellation update operation. As a result, the echo update signal will consist primarily of the residual echo and the noise from the wireline/ loop. The error signal can be used at the fractional spacing rate to update all of the echo canceler coefficients, largely without interference from the much larger received information signal. This allows a higher echo canceler gain than that currently incorporated into HDSL2 echo canceler updates. -- |
| Column 1, Line 30 | Delete: “preceding and”<br>Insert: -- precoding and -- |
| Column 1, Line 31 | Delete: “preceding is”<br>Insert: -- precoding is -- |
| Column 2, Line 8 | Delete: “preceding used”<br>Insert: -- precoding used -- |
| Column 2, Line 9 | Delete: “preceding at”<br>Insert: -- precoding at -- |
| Column 2, Line 12 | Delete: “preceding at”<br>Insert: -- precoding at-- |
| Column 3, Line 61 | Delete: “module operation,”<br>Insert: --modulo operation, -- |
| Column 3, Line 65 | Delete: “module operation.”<br>Insert: --modulo operation. -- |

UNITED STATES PATENT AND TRADEMARK OFFICE

CERTIFICATE OF CORRECTION

PATENT NO. : 6,996,230 B1

APPLICATION NO. : 10/460968

DATED : February 7, 2006

INVENTOR(S) : Fred. T. Chu, Michael D. Turner and Ayman K. Ghobrial

It is certified that error appears in the above-identified patent and that said Letters Patent is hereby corrected as shown below:

| | |
|---|---|
| Column 4, Line 1 | Delete: "as the module"<br>Insert: --as the modulo -- |
| Column 4, Line 3 | Delete: "module operator. Because the module operation"<br>Insert: -- modulo operator. Because the modulo operation -- |
| Column 5, Line 28 | Delete: "preceding and"<br>Insert: -- precoding and -- |
| Column 7, Line 25 | Delete: "Tomlinson preceding"<br>Insert: -- Tomlinson precoding -- |
| Column 8, Line 5 | Delete: "module operator 410"<br>Insert: -- modulo operator 410 -- |
| Column 8, Line 7 | Delete: "module operator 410."<br>Insert: -- modulo operator 410. -- |
| Column 8, Line 42 | Delete: "Tomlinson preceding,"<br>Insert: -- Tomlinson precoding, -- |
| Column 10, Line 65 | Delete: "subjected to preceding"<br>Insert: -- subjected to precoding -- |
| Column 11, Line 34 | Delete: "said decider,"<br>Insert: -- said decoder, -- |
| Column 11, Line 39 | Delete: "said preceding comprises"<br>Insert: -- said precoding comprises -- |
| Column 12, Line 48 | Delete " received signal produce"<br>Insert: -- received signal to produce -- |

UNITED STATES PATENT AND TRADEMARK OFFICE

CERTIFICATE OF CORRECTION

PATENT NO. : 6,996,230 B1
APPLICATION NO. : 10/460968
DATED : February 7, 2006
INVENTOR(S) : Fred. T. Chu, Michael D. Turner and Ayman K. Ghobrial It is certified that error appears in the above-identified patent and that said Letters Patent is hereby corrected as shown below:

Column 13, Line 1 — Delete: "to claim 9,"
Insert: -- to claim 6, --

Signed and Sealed this

Eighth Day of August, 2006

JON W. DUDAS

*Director of the United States Patent and Trademark Office*